US010032240B2

(12) United States Patent
Ashley et al.

(10) Patent No.: US 10,032,240 B2
(45) Date of Patent: Jul. 24, 2018

(54) EXECUTING ELECTRONIC CONTRACT ON NFC ENABLED MOBILE DEVICES

(71) Applicant: INTERNATIONAL BUSINESS MACHINES CORPORATION, Armonk, NY (US)

(72) Inventors: Paul A. Ashley, Toowong (AU); Anthony M. Butler, Dubai (AE); Ravi Kothari, New Delhi (IN); Yu-Chen Lin, New Taipei (TW)

(73) Assignee: International Business Machines Corporation, Armonk, NY (US)

( * ) Notice: Subject to any disclaimer, the term of this patent is extended or adjusted under 35 U.S.C. 154(b) by 940 days.

(21) Appl. No.: 14/074,836

(22) Filed: Nov. 8, 2013

(65) Prior Publication Data

US 2015/0134561 A1    May 14, 2015

(51) Int. Cl.
G06K 15/00 (2006.01)
G06Q 99/00 (2006.01)
H04W 4/80 (2018.01)

(52) U.S. Cl.
CPC .............. *G06Q 99/00* (2013.01); *H04W 4/80* (2018.02)

(58) Field of Classification Search
CPC .................. G06Q 10/101; G06Q 30/0645
USPC ........ 235/383, 380, 462.46, 472.02; 705/342
See application file for complete search history.

(56) References Cited

U.S. PATENT DOCUMENTS

| 6,202,151 | B1* | 3/2001 | Musgrave .............. G06Q 20/04 713/170 |
| 7,685,020 | B2 | 3/2010 | Do et al. |
| 8,041,338 | B2 | 10/2011 | Chen et al. |
| 8,271,393 | B2 | 9/2012 | Twining et al. |
| 8,275,353 | B2 | 9/2012 | Sun et al. |
| 2006/0212394 | A1 | 9/2006 | Terada et al. |

(Continued)

FOREIGN PATENT DOCUMENTS

| EP | 1533724 A1 | 5/2005 |
| JP | 2001-297278 | 10/2001 |
| JP | 2006-252470 | 9/2006 |

OTHER PUBLICATIONS

Valimo Wireless Ltd, "Valimo Mobile ID in the NFC World", Valimo Wireless Ltd, No Date, pp. 1-4.

(Continued)

*Primary Examiner* — Daniel St Cyr
(74) *Attorney, Agent, or Firm* — Law Office of Jim Boice (57) ABSTRACT

A method, system and/or NFC (Near field communication) enabled mobile device is provided for executing an electronic contract on NFC enabled mobile devices. A first contracting party is provided to apply an electronic signature thereof in an electronic contract provided on a first NFC enabled mobile device used by the first contracting party, the electronic signature is applied through a secure element of the first NFC enabled mobile device. The electronically signed contract is transmitted from the first NFC enabled mobile device to a second NFC enabled mobile device used by a second contracting party for providing the second contracting party to apply an electronic signature thereof in the received electronically signed contract from the first NFC enabled mobile device through a secure element in the second NFC enabled mobile device.

11 Claims, 4 Drawing Sheets

(56) References Cited

U.S. PATENT DOCUMENTS

| | | | |
|---|---|---|---|
| 2009/0125387 A1* | 5/2009 | Mak | G06Q 10/02 |
| | | | 705/14.73 |
| 2010/0063892 A1* | 3/2010 | Keronen | G06Q 30/04 |
| | | | 705/26.1 |
| 2012/0116972 A1 | 5/2012 | Walker | |
| 2012/0150748 A1 | 6/2012 | Law et al. | |
| 2013/0061051 A1 | 3/2013 | Kim et al. | |
| 2014/0281946 A1* | 9/2014 | Avni | G06T 1/0021 |
| | | | 715/268 |
| 2014/0365350 A1* | 12/2014 | Shvarts | G06Q 40/00 |
| | | | 705/35 |

OTHER PUBLICATIONS

Wikipedia Contributors, "Near Field Communication", wikipedia.org, Last Modified on Nov. 5, 2013, Retrieved Nov. 7, 2013, pp. 1-11.

Wikipedia Contributors, "Digital Signature", wikipedia.org, Last Modified on Nov. 7, 2013, Retrieved Nov. 7, 2013, pp. 1-10.

Anonymous, "GlobalPlatform: Device Specifications", GlobalPlatform, globalplatform.org 2013, pp. 1-2.

R. Levin et al., "Finding a Better Approach to PKI-Based Digital Signatures", ARX White Paper, arx.com, Jun. 2006, pp. 1-15.

International Searching Authority, International Application No. PCT/JP2014/004214: Written Opinion dated Oct. 23, 2014.

\* cited by examiner

EXECUTING ELECTRONIC CONTRACT ON NFC ENABLED MOBILE DEVICES

BACKGROUND

The present invention relates to executing electronic contract on NFC enabled mobile devices.

One of the key goals of Near Field Communications (NFC) technology is to enable mobile and contactless payments. In the typical use case, a vendor will have an NFC enabled reader and a user will swipe their NFC-enabled phone against the reader in order to effect a transaction against an electronic "wallet" persisted on the phone. In an alternative use case scenario, two participants in a transaction will place their respective devices against the other and transfer cash from the electronic wallet of one person to the other.

However, there are many transactions that are not simply the exchange of monetary value but also require contracts to be exchanged or signed. For example, the purchase of an item may require agreement to extended warranty terms, rental agreement for a vehicle, or there may be transactions that do not involve any monetary aspect but are simply contractual—such as a commitment to buy something at a later date or a rental agreement for a property. NFC standards currently have nothing to offer in these areas.

SUMMARY

A method, system and/or NFC (Near field communication) enabled mobile device is provided for executing an electronic contract on NFC enabled mobile devices. A first contracting party is provided to apply an electronic signature thereof in an electronic contract provided on a first NFC enabled mobile device used by the first contracting party, the electronic signature is applied through a secure element of the first NFC enabled mobile device. The electronically signed contract is transmitted from the first NFC enabled mobile device to a second NFC enabled mobile device used by a second contracting party for providing the second contracting party to apply an electronic signature thereof in the received electronically signed contract from the first NFC enabled mobile device through a secure element in the second NFC enabled mobile device. According to an embodiment of the invention, the electronic signature includes a digital signature applied on the electronic contract using public-key cryptography wherein the digital signature using public-key cryptography is generated and applied through one or more underlying mobile applications stored and executed on the respective secure elements of the first and second NFC enabled mobile devices.

DETAILED DESCRIPTION

According to an embodiment of the invention, a public key certificate thereof issued by a certifying authority is transmitted by the first contracting party along with the digitally signed electronic contract for verification of the digital signature thereof by the second contract party. Further, the digitally signed electronic contract by the second contracting party is received by the first contracting party along with a public key certificate of the second contracting party issued by the certifying authority for verification of the digital signature of the second contracting party by the first contracting party.

According to another embodiment of the invention, the electronically signed electronic contract by the first and second contracting parties is further transmitted to a third NFC enabled mobile device used by a third contracting party, if any, for an electronic signature thereof on the electronically signed electronic contract by the first and second contracting parties. The transmission of the electronically signed electronic contracts between the NFC enabled mobile devices of the contracting parties is through one or more medium of transmission available in the mobile devices such as NFC, internet, Bluetooth or NFC reader.

Figure 1:
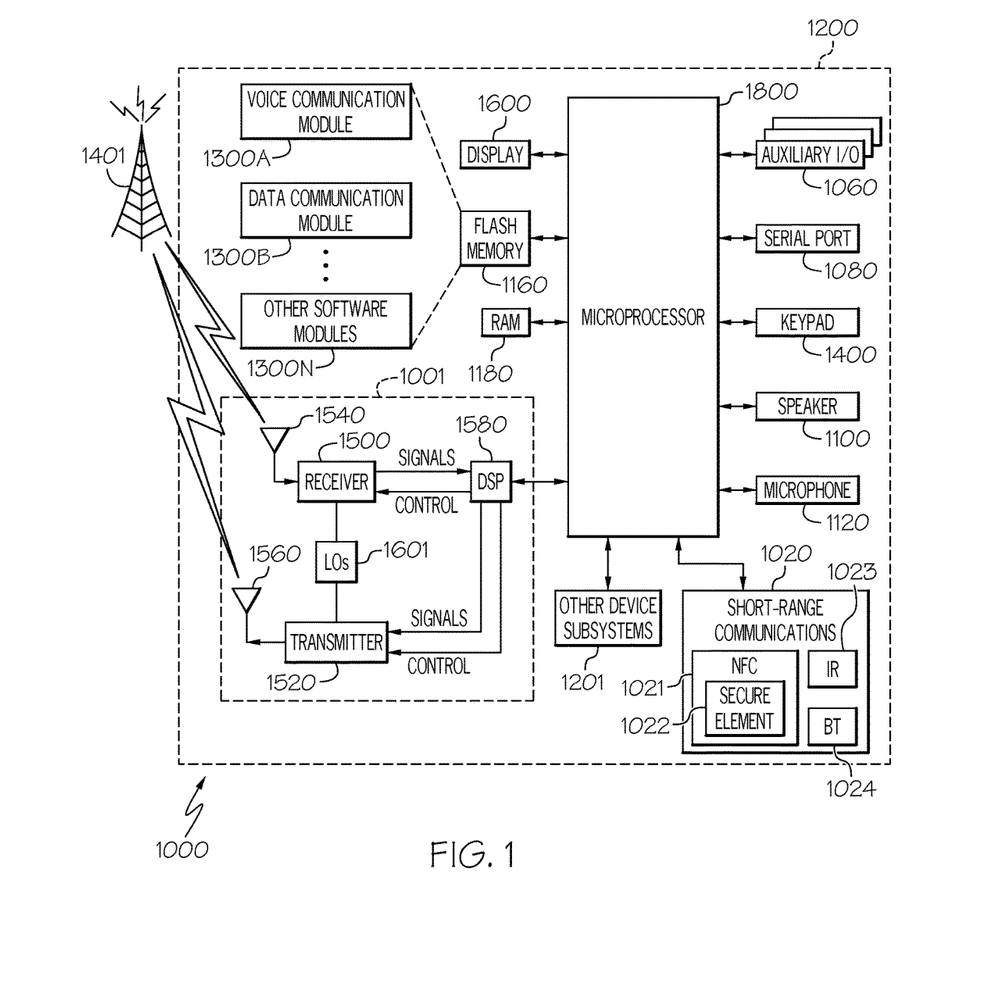
FIG. 1 is a schematic block diagram illustrating example components of an NFC enabled mobile device that may be used to implement an embodiment of the invention.

FIG. 1 is a schematic block diagram illustrating example components of an NFC enabled mobile device that may be used to implement an embodiment of the invention. Example components of a NFC enabled mobile device 1000 that may be used in accordance with an example embodiment are further described below with reference to FIG. 4. The NFC enabled mobile device 1000 illustratively includes a housing 1200, a keyboard or a keypad 1400 and an output device 1600. The output device shown is a display 1600, which may comprise a full graphic LCD. Other types of output devices may alternatively be utilized. A processing device 1800 is contained within the housing 1200 and is coupled between the keypad 1400 and the display 1600. The processing device 1800 controls the operation of the display 1600, as well as the overall operation of the mobile device 1000, in response to actuation of keys on the keypad 1400.

The housing 1200 may be elongated vertically, or may take on other sizes and shapes (including clamshell housing structures). The keypad may include a mode selection key, or other hardware or software for switching between text entry and telephony entry.

In addition to the processing device 1800, other parts of the mobile device 1000 are shown schematically in FIG. 1. These include a communications subsystem 1001, a short-range communications subsystem 1020, the keypad 1400 and the display 1600, along with other input/output devices 1060, 1080, 1100 and 1120; as well as memory devices 1160, 1180 and various other device subsystems 1201. The mobile device 1000 may comprise a two-way RF communications device having data and, optionally, voice communications capabilities. In addition, the mobile device 1000 may have the capability to communicate with other computer systems via the Internet.

Operating system software executed by the processing device 1800 is stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180. Communications signals received by the mobile device may also be stored in the RAM 1180.

The processing device 1800, in addition to its operating system functions, enables execution of software applications 1300A-1300N on the device 1000. A predetermined set of applications that control basic device operations, such as data and voice communications 1300A and 1300B, may be installed on the device 1000 during manufacture. In addition, a personal information manager (PIM) application may be installed during manufacture. The PIM may be capable of organizing and managing data items, such as e-mail, calendar events, voice mails, appointments, and task items. The PIM application may also be capable of sending and receiving data items via a wireless network 1401. The PIM data items may be seamlessly integrated, synchronized and updated via the wireless network 1401 with corresponding data items stored or associated with a host computer system.

Communication functions, including data and voice communications, are performed through the communications subsystem 1001, and possibly through the short-range communications subsystem. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (LOS) 1601. The specific design and implementation of the communications subsystem 1001 is dependent upon the communications network in which the mobile device 1000 is intended to operate. For example, a mobile device 1000 may include a communications subsystem 1001 designed to operate with the General Packet Radio Service (GPRS) mobile data communications networks, and also designed to operate with any of a variety of voice communications networks, such as AMPS, TDMA, CDMA, WCDMA, PCS, GSM, EDGE, etc. Other types of data and voice networks, both separate and integrated, may also be utilized with the mobile device 1000. The mobile device 1000 may also be compliant with other communications standards such as 3GSM, 3GPP, UMTS, etc.

Network access requirements vary depending upon the type of communication system. For example, in GPRS networks, network access is associated with a subscriber or user of a device. A GPRS device therefore typically involves use of a subscriber identity module, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary I/O device 1060. A device may also be used to compose data items, such as e-mail messages, using the keypad 1400 and/or some other auxiliary I/O device 1060, such as a touchpad, a rocker switch, a thumb-wheel, or some other type of input device. The composed data items may then be transmitted over the communications network 1401 via the communications subsystem 1001.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

The short-range communications subsystem 1020 includes NFC (Near field communication) 1021 capability. NFC 1021 capability includes a secure element 1022 therein to securely store applications and/or credentials and provide for secure execution of applications. The secure element 1022 (secure memory and execution environment) is a dynamic environment in which application code and application data can be securely stored and administered and in which secure execution of applications occur. The secure element 1022 resides in highly secure crypto chips (usually a smart card chip). The secure element 1022 provides delimited memory for each application and other functions that can encrypt, decrypt, and sign the data packet. The secure element 1022 could be implemented either by a separate secure smart card chip (currently implemented in most of the NFC-enabled mobile devices), in the SIM/UICC (which is used by GSM mobile phone operators to authenticate subscribers on their networks and maintain personalized subscriber information and applications), or in an SD card that can be inserted in the mobile device. The secure element 1022 implementation approach is selected by the mobile operator implementing the service and/or by the payment service provider (for SD card implementations). Other short-range communications subsystem may include an infrared device 1023 and associated circuits and components or a Bluetooth™ communications module 1024 to provide for communication with similarly-enabled systems and devices.

Many modifications and other embodiments will come to the mind of one skilled in the art having the benefit of the teachings presented in the foregoing descriptions and the associated drawings. Therefore, it is understood that various modifications and embodiments are intended to be included within the scope of the appended claims.

Those of the ordinary skill in the art will appreciate that the hardware in FIG. 1 is a basic NFC enabled mobile device and may vary. The architecture of the aforementioned NFC enabled mobile device is not limiting and is only depicted as an example on which an embodiment of the present invention may be implemented.

Figure 2:
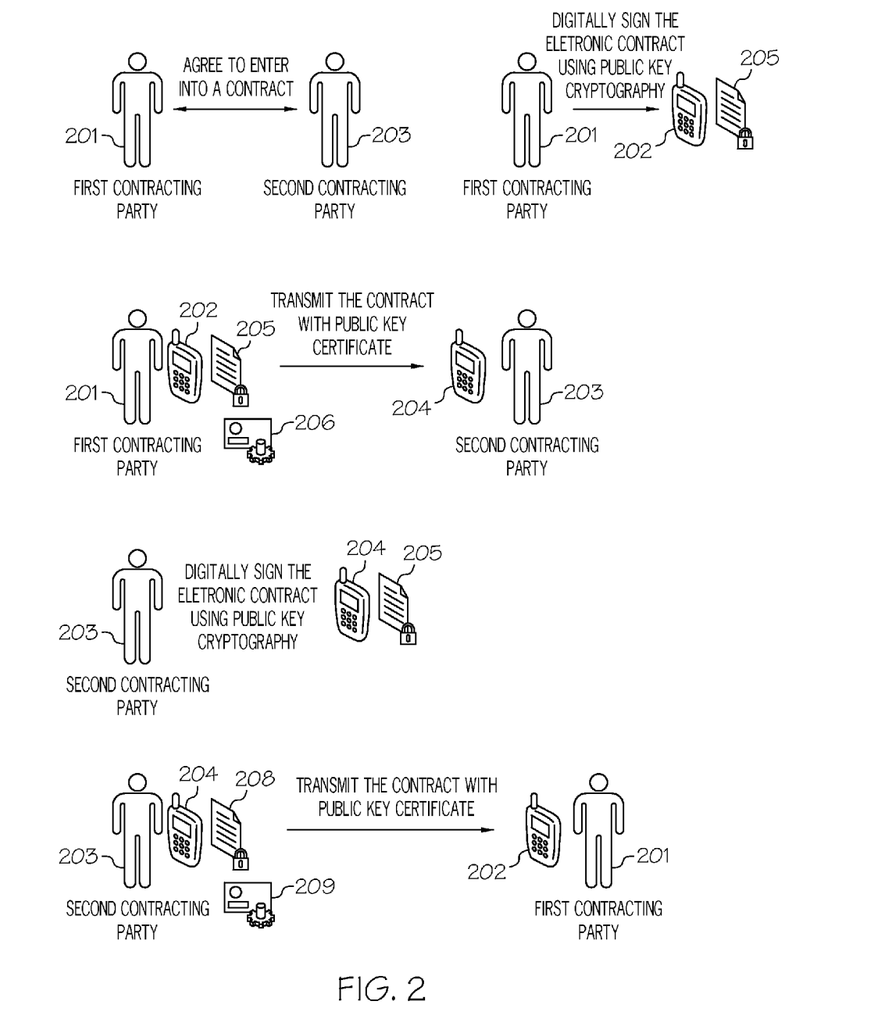
FIG. 2 illustrates a block diagram of a system for implementing embodiments of the present invention.

FIG. 2 depicts a system for implementing an embodiment of the present invention. A first contracting party 201 using a first NFC-enabled mobile device 202 (referred to as a first mobile device 202 for the rest of the description) agrees with a second contracting party 203 using a second NFC-enabled mobile device 204 (referred to as a second mobile device 204 for the rest of the description) to enter into a contract therebetween. The first contracting party 201 electronically signs an electronic contract 205 provided on his first mobile device 202 through a secure element (as shown in FIG. 1) on the first mobile device 202. It is a known art to possess, read and edit electronic contract 205 on mobile devices.

According to an embodiment, the electronic signature applied on the electronic contract 205 by the first contracting party may be a digital signature using public-key cryptography. In public-key cryptography two keys are generated or provided, a public key and a private key. They have a mathematical relationship therebetween. The public key is provided to a trusted third party Certifying Authority who then provides a public key certificate with the public key embedded therein. The public key certificate may be published without compromising security, while the private key must not be revealed to anyone. The private key is used to encrypt a hash function of a document using an encryption algorithm (e.g., RSA Algorithm). The hash function takes some arbitrary length of data within the document and applies a mathematical calculation on it. The output is a "hash" which is a fixed length data. e.g. 256 bytes. The encrypted hash function of the document is a digital signature which accompanies the document or applied therein to have a digitally signed document. The digital signature is a standard term defining the operation of taking a hash function of the electronic file and then encrypting it with the private key of the signer. Below is an example of a digital signature.

>nihUFQg4mDhLgecvhIcKb9Gz8VRTOlw+adiZOBBXgK4JodEe5aFfCqm8WcRIT8G
L
LXSk8PsUP4//SsKqUBQkpotcAqQAhtz2v9kCWdoUDnAOtFZkd/CnsZ1sge0ndha4
0wWDV+nOWyJxkYgicvB8POYtSmldLLepPGMz+J7/Uws=

According to an embodiment, generation of the public and private keys, digitally signing the electronic contract 205 i.e. taking a hash function of the electronic contract 205 and encrypting it with the private key may be performed by a mobile application stored and executed on a secure element on the first mobile device 202. The first contract party 201 may obtain a public key certificate from a certifying authority which may be a Mobile Network Operator (MNO) of the NFC service provider. The operation of transmitting the public key and subsequent receipt of the public key certificate may be performed by the aforementioned mobile application or a separate mobile application stored and executed on the secure element of the first mobile device 202. Alternatively, the private key, public key and its associated public key certificate can be generated by the Mobile Network Operator (MNO) at the point of NFC SIM delivery to the user. Upon purchasing the NFC SIM, the recipient presents his ID to prove their identity and the MNO will issue the private/public keys and associated certificate. These are deployed to the secure element of NFC SIM. The MNO would then act as the Certifying Authority for the keys. The public key certified by an authority and tied to a physical person enables it to be verified by any third party to whom it is transmitted.

As described earlier, the secure element (secure memory and execution environment) is a dynamic environment in which application code and application data can be securely stored and administered and in which secure execution of applications occur. The secure element resides in highly secure crypto chips (usually a smart card chip). The secure element provides delimited memory for each application and other functions that can encrypt, decrypt, and sign the data packet. The secure element could be implemented either by a separate secure smart card chip (currently implemented in most of the NFC-enabled mobile devices), in the SIM/UICC (which is used by GSM mobile phone operators to authenticate subscribers on their networks and maintain personalized subscriber information and applications), or in an SD card that can be inserted in the mobile devices. The secure element implementation approach is selected by the mobile operator implementing the service.

The electronically signed electronic contract 205 by the first contracting party 201 along with the public key certificate 206 of the first contracting party 201 is transmitted from the first mobile device 202 to the second mobile device 204 used by the second contracting party 203. Preferred medium of transmission may be NFC since both the first mobile device 202 and second mobile device 204 are NFC enabled. This may be done by simply tapping each other's NFC enabled mobile devices 202 and 204. However, if the contract execution is happening remotely, other alternate mediums such as Email or MMS may be used. Alternatively, an NFC reader may also be used a medium of transmission. An embodiment describing the NFC reader as a medium of transmission is described later in the specification.

The second contracting party 203, upon receiving the electronically signed electronic contract 205 from first contracting party 201, reviews and verifies the authenticity thereof using the public key certificate 206 of the first contracting party 201. To verify, the second contracting party 203 first decrypts the hash function of the electronic contract 205 using the public key within the public key certificate 206 and compares thereof with a fresh hash function of the electronic contract 205 taken by him. If both the hash functions are same, it means that the electronic contract 205 is genuine, has been indeed signed by the first contract party 201 and the electronic contract 205 is unchanged since it was signed. Subsequently, the second contracting party 203 encrypts the hash function taken by him using his private key thus applying his digital signature too on the electronic contract 205. The aforementioned process of digitally signing of the electronic contract 205 by the second contracting party 203 is performed in the same manner as described above through a secure element of the second mobile device 204. Thus, the electronic contract 205 electronically signed by both the contracting parties becomes an executed electronic contract 208. The executed electronic contract 208 is transmitted back to the first mobile device 202 from the second mobile device 204 along with the public key certificate 209 of the second contracting party 203. The first contracting party 201 upon receiving the executed electronic contract 208 verifies thereof using the public key certificate 209 of the second contracting party 203 in the same manner as described above.

If there are further contracting parties other than the second contracting party 203, the first contracting party 201 transmits the electronically signed electronic contract 205 by the first 201 and second 203 contracting parties to a third NFC enabled mobile device of a third contracting party, if any, along with both their public key certificates 206 and 209. The third contracting party transmits the electronically signed electronic contract back to the first contracting party 201 after electronically signing thereof along with a public key certificate thereof. The first contracting 201 subsequently transmits the electronically signed contract 205, in the same manner as described above, to all contracting parties, one by one, to receive the executed electronic contract electronically signed by all contracting parties.

Alternatively, the second contracting party 203 transmits the electronically signed electronic contract 205 by the first 201 and second 203 contracting parties to a third contracting party, if any, along with both their public key certificates 206 and 209. The third contracting party may further transmit it to a subsequent contracting party after electronically signing thereof (along with all three public key certificates of the first, second and third contracting parties). Finally, the executed electronic contract signed by all contracting parties is transmitted to the first mobile device 202 of the first contracting party 201 from a NFC enabled mobile device of a last contracting party along with the public key certificates of all the contracting parties.

The first contracting party 201 may subsequently transmit the executed electronic contract 208 to one or more witness parties in the same manner as described above for their electronic signatures on the executed electronic contract 208. The executed electronic contract 208 with witnesses' electronic signatures may be transmitted to a third party for safe custody.

According to another embodiment, a NFC reader is used as the medium of transmission between the first and second contracting parties. Say, the first contracting party is an owner of a car fleet company who rents cars to individuals and the second contracting party wants to rent a car from the first contracting party. The second contracting party makes a booking (accompanied by a monetary transaction) of a car on the first contracting party's website and generates a booking receipt which can be read by a NFC reader. The first contracting party upon receiving the booking prepares an electronic contract and electronically signs thereof as described above through the first mobile device used by him which is interfaced with the NFC reader. The electronic contract signed by the first contracting party is made ready for transmission (along with the public key and its associated certificate of the first contracting party) to the second contracting party through the NFC reader as soon as the booking receipt issued to the first contracting party is read by the NFC reader. The NFC reader may be placed at the gate of the car parking facility of the car fleet company. The second contracting party places his second mobile device storing the booking receipt issued by the first contracting party near the NFC reader. The NFC reader upon reading the booking receipt transmits the electronically signed electronic contract by the first contracting party along with the public key certificate of the first contracting party to the second mobile device of the second contracting party. The second contracting party reviews, verifies the electronically signed electronic contract using the public key certificate of the first contracting party and electronically signs the electronic contract as described above through the secure element of his second mobile device. Thus, the electronic contract electronically signed by both the contracting parties becomes the executed electronic contract. The second contracting party again places his second mobile device near the NFC reader to transmit the executed electronic contract along with his public key certificate to the first mobile device of the first contracting party through the NFC reader. The first contracting party upon receiving the executed electronic contract verifies thereof using the public key certificate of the second contracting party and releases a car for renting to the second contracting party. The computing and networking ecosystem interfacing the first contracting party's website, first mobile device and the NFC reader to perform the aforementioned functions may be developed by any person skilled in the art and such does not merit a detailed description here.

Figure 3:
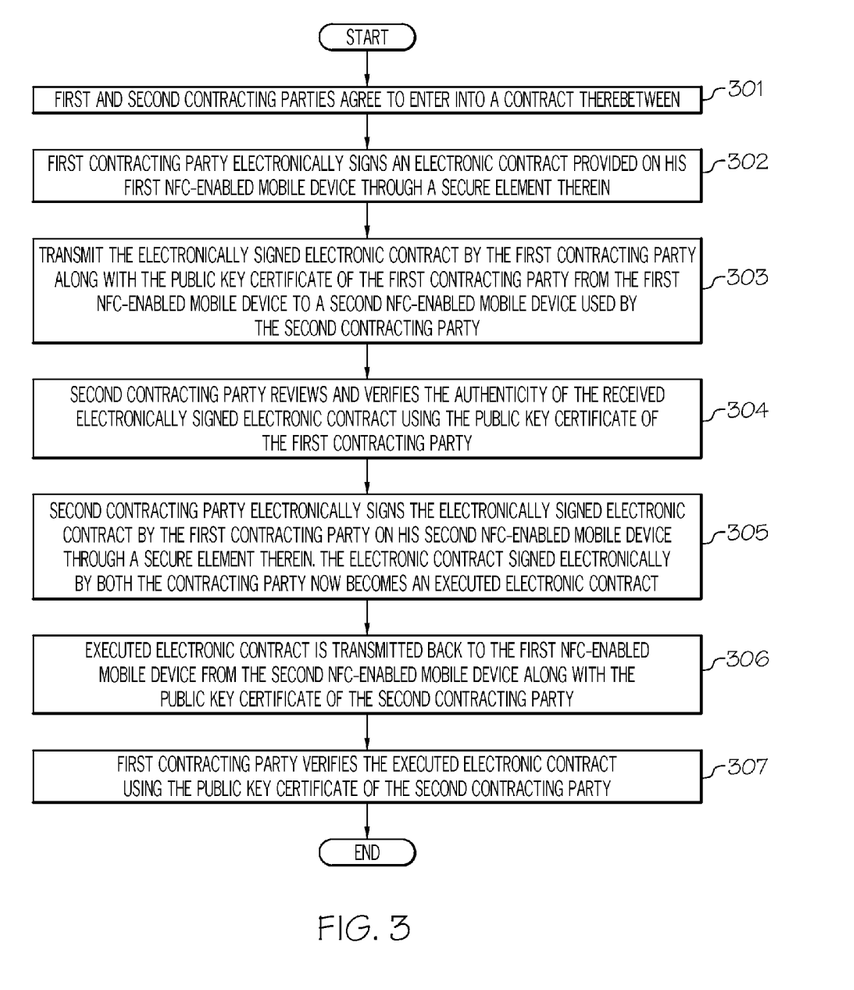
FIG. 3 illustrates a flowchart depicting steps to be performed for implementing an embodiment of the present invention.

FIG. 3 illustrates flowcharts depicting steps to be performed for implementing an embodiment of the present invention. At step 301, a first contracting party using a first NFC-enabled mobile device (referred to as a first mobile device for the rest of the description) agrees with a second contracting party using a second NFC-enabled mobile device (referred to as a second mobile device for the rest of the description) to enter into a contract therebetween. At step 302, the first contracting party electronically signs an electronic contract provided on his first mobile device through a secure element on the first mobile device. It is a known art to possess, read and edit electronic contract on mobile devices.

According to an embodiment, the electronic signature applied on the electronic contract by the first contracting party may be a digital signature using public-key cryptography. In public-key cryptography two keys are generated or provided, a public key and a private key. They have a mathematical relationship therebetween. The public key is provided to a trusted Certifying Authority who then provides a public key certificate with the public key embedded therein. The public key certificate may be published without compromising security, while the private key must not be revealed to anyone. The private key is used to encrypt a hash function of a document using an encryption algorithm (e.g., RSA Algorithm). The hash function takes some arbitrary length of data within the document and applies a mathematical calculation on it. The output is a "hash" which is a fixed length data. e.g. 256 bytes. The encrypted hash function of the document is a digital signature which is accompanies the document or applied therein to have a digitally signed document. The digital signature is a standard term defining the operation of taking a hash function of the electronic file and then encrypting it with the private key of the signer. Below is an example of a digital signature.

```
>nihUFQg4mDhLgecvhIcKb9Gz8VRTOlw+adiZOBBXgK4JodEe5aFfCqm8WcRIT8G
L
LXSk8PsUP4//SsKqUBQkpotcAqQAhtz2v9kCWdoUDnAOtFZkd/CnsZ1sge0ndha4
0wWDV+nOWyJxkYgicvB8POYtSmldLLepPGMz+J7/Uws=
```

According to an embodiment, generation of the public and private keys, digitally signing the electronic contract i.e. taking a hash function of the electronic contract and encrypting it with the private key may be performed by a mobile application stored and executed on a secure element on the first mobile device. The first contract party may obtain a public key certificate from a third party which may be a Mobile Network Operator (MNO) of the NFC service provider. The operation of transmitting the public key and subsequent receipt of the public key certificate may be performed by the aforementioned mobile application or a separate mobile application stored and executed on the secure element of the first mobile device. Alternatively, the private key, public key and its associated public key certificate can be generated by the Mobile Network Operator (MNO) at the point of NFC SIM delivery to the user. Upon purchasing the NFC SIM, the recipient presents his ID to prove their identity and the MNO will issue the private/public keys and associated certificate. These are deployed to the secure element of NFC SIM. The MNO would then act as the Certifying Authority for the keys. The public key certified by an authority and tied to a physical person enables it to be verified by any third party to whom it is transmitted.

As described earlier, the secure element (secure memory and execution environment) is a dynamic environment in which application code and application data can be securely stored and administered and in which secure execution of applications occur. The secure element resides in highly secure crypto chips (usually a smart card chip). The secure element provides delimited memory for each application and other functions that can encrypt, decrypt, and sign the data packet. The secure element could be implemented either by a separate secure smart card chip (currently implemented in most of the NFC-enabled mobile devices), in the SIM/UICC (which is used by GSM mobile phone operators to authenticate subscribers on their networks and maintain personalized subscriber information and applications), or in an SD card that can be inserted in the mobile devices. The secure element implementation approach is selected by the mobile operator implementing the service.

At step 303, the electronically signed electronic contract by the first contracting party along with the public key certificate of the first contracting party is transmitted from the first mobile device to the second mobile device used by the second contracting party. Preferred medium of transmission may be NFC since both the first and second mobile devices are NFC enabled. This may be done by simply tapping each other's NFC enabled mobile devices. However, if contract execution is happening remotely, other alternate mediums such as Email or MMS may be used. Alternatively, an NFC reader may also be used a medium of transmission. An embodiment describing the NFC reader as a medium of transmission is described later in the specification.

At step 304, the second contracting party upon receiving the electronically signed contract from first contracting party reviews and verifies the authenticity thereof using the public key certificate of the first contracting party. To verify, the second contracting party first decrypts the hash function of the electronic contract using the public key within the public key certificate and compares thereof with a fresh hash function of the electronic contract taken by him. If both the hash functions are same, it means that the electronic contract is genuine, has been indeed signed by the first contract party and is unchanged since it was signed.

At step 305, the second contracting party electronically signs the electronic contract by encrypting the hash function of the electronic contract taken by him using his private key thus applying his digital signature too on the electronic contract. The aforementioned process of digitally signing of the electronic contract by the second contracting party is performed in the same manner as described above through a secure element of the second mobile device in the same manner as described above through the secure element of the second mobile device. Thus, the electronic contract electronically signed by both the contracting parties becomes an executed electronic contract. At step 306, the executed electronic contract is transmitted back to the first mobile device from the second mobile device along with the public key certificate of the second contracting party. At step 307, the first contracting party upon receiving the executed electronic contract verifies thereof using the public key certificate of the second contracting party in the same manner as described above.

If there are further contracting parties other than the second contracting party, the first contracting party transmits the electronically signed electronic contract by the first and second contracting parties to a third NFC enabled mobile device of a third contracting party, if any, along with both their public key certificates. The third contracting party transmits the electronically signed electronic contract back to the first contracting party after electronically signing thereof along with a public key certificate thereof. The first contracting subsequently transmits the electronically signed contract, in the same manner as described above, to all contracting parties, one by one, to receive the executed electronic contract electronically signed by all contracting parties.

Alternatively, the second contracting party transmits the signed electronic contract by the first and second contracting parties to the third contracting party, if any, along with both their public key certificates. The third contracting party further transmits it to a subsequent contracting party, if any, after electronically signing thereof (along with all three public key certificates of the first, second and third contracting parties). Finally, the executed electronic contract signed by all contracting parties is transmitted to the first mobile device of the first contracting party from a mobile device of a last contracting party along with the public key certificates of all the contracting parties.

The first contracting party may subsequently transmit the executed electronic contract to one or more witness parties in the same manner as described above for their electronic signatures on the executed electronic contract. The executed electronic contract with witnesses' electronic signatures may be transmitted to a third party for safe custody.

Figure 4:
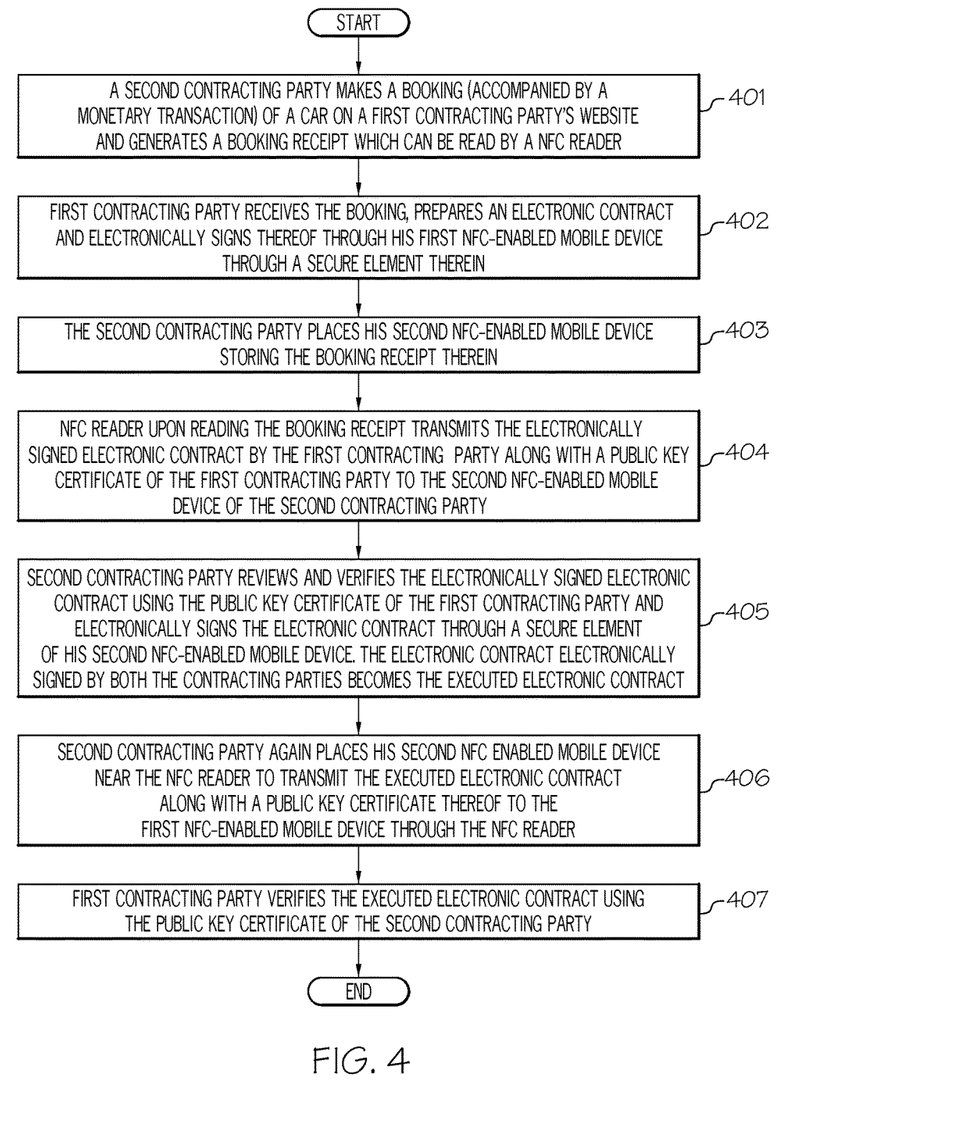
FIG. 4 illustrates a flowchart depicting steps to be performed for implementing another embodiment of the present invention involving a NFC reader as medium of transmission.

FIG. 4 illustrates a flowchart depicting steps to be performed for implementing another embodiment of the present invention involving a NFC reader as medium of transmission. Say, the first contracting party is an owner of a car fleet company who rents cars to individuals and the second contracting party wants to rent a car from the first contracting party. At step 401, the second contracting party makes a booking (accompanied by a monetary transaction) of a car on the first contracting party's website and generates a booking receipt which can be read by a NFC reader. At step 402, the first contracting party upon receiving the booking prepares an electronic contract and electronically signs thereof as described above through the first mobile device interfaced with the NFC reader. The electronic contract signed by the first contracting party is made ready for transmission (along with the public key certificate of the first contracting party) to the second contracting party through the NFC reader as soon as the booking receipt issued to the first contracting party is read by the NFC reader. The NFC reader may be placed at the gate of the car parking facility of the car fleet company. At step 403, the second contracting party places his second mobile device storing the booking receipt issued by the first contracting party near the NFC reader. At step 404, the NFC reader upon reading the booking receipt transmits the electronically signed electronic contract by the first contracting party along with the public key certificate of the first contracting party to the second mobile device of the second contracting party. At step 405, the second contracting party reviews, verifies the electronically signed electronic contract using the public key certificate of the first contracting party and electronically signs the electronic contract as described above through the secure element of his second mobile device. Thus, the electronic contract electronically signed by both the contracting parties becomes the executed electronic contract. At step 406, the second contracting party again places his second mobile device near the NFC reader to transmit the executed electronic contract along with a public key certificate thereof to the first contracting party through the NFC reader. At step 407, the first contracting party upon receiving the executed electronic contract verifies thereof using the public key certificate of the second contracting party and releases a car for renting to the second contracting party. The computing and networking ecosystem interfacing the first contracting party's website, first mobile device and the NFC reader to perform the aforementioned functions may be developed by any person skilled in the art and such does not merit a detailed description here.

According to the invention, a secure element of a NFC enabled mobile device includes a Trusted Execution Environment (TEE) that ensures a very high level of security of the data (e.g. private key) and application (e.g. signing application). Thus, strong digital signatures can be created that can be trusted for electronic contracts.

The flowchart and block diagrams in the figures illustrate the architecture, functionality, and operation of possible implementations of systems, methods and NFC enabled mobile devices according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system of Near Field Communication (NFC) enabled mobile devices for executing an electronic contract, the system operable to:

provide a first contracting party to apply an electronic signature thereof in an electronic contract provided on a first NFC enabled mobile device used by the first contracting party, the electronic signature applied through a secure element of the first NFC enabled mobile device;

determine whether the first NFC enabled mobile device is within NFC range to a second NFC enabled mobile device used by a second contracting party to the electronic contract;

in response to determining that the first NFC enabled mobile device is within NFC range to the second NFC enabled mobile device, transmit the electronically signed electronic contract from the first NFC enabled mobile device to the second NFC enabled mobile device in order to enable the second contracting party to apply an electronic signature thereof in the received electronically signed contract from the first NFC enabled mobile device through a secure element of the second NFC enabled mobile device, wherein the electronically signed electronic contract is transmitted from the first NFC enabled mobile device to the second NFC enabled mobile device by tapping the first NFC enabled mobile device against the second NFC enabled mobile device; and in response to determining that the first NFC enabled mobile device is not within NFC range to the second NFC enabled mobile device, sending, from the first NFC enabled mobile device to the second NFC enabled mobile device, an email that includes the electronic contract.

2. The system of claim 1, wherein the electronic signature includes a digital signature generated and applied on the electronic contract using public-key cryptography through one or more underlying mobile applications stored and executed on the respective secure elements of the first and second NFC enabled mobile devices.

3. The system of claim 2, further operable to transmit a public key certificate of the first contracting party issued by a certifying authority along with the digitally signed electronic contract by the first contracting party for verification of the digital signature of the first contracting party by the second contract party.

4. The system of claim 2, further operable to receive the digitally signed electronic contract by the second contracting party from the second contracting party along with a public key certificate of the second contracting party issued by the certifying authority for verification of the digital signature of the second contracting party by the first contracting party.

5. The system of claim 1, further operable to transmit the electronically signed electronic contract by the first and second contracting parties to a third NFC enabled mobile device used by a third contracting party, if any, for an electronic signature thereof on the electronically signed electronic contract by the first and second contracting parties.

6. The system of claim 1, wherein the transmission of the electronically signed electronic contracts between the NFC enabled mobile devices of the contracting parties is through one or more mediums of transmission available in the NFC enabled mobile devices such as internet, Bluetooth or NFC (Near Field Communication).

7. The system of claim 1, wherein the electronic contract is encrypted by the first NFC enabled device using a public-key cryptography in order to generate an encrypted electronic contract, and wherein the system is further operable to:

generate a public key used in the public-key cryptography by a mobile application that is stored and executed on the secure element in the first NFC enabled device; and transmit, from the first NFC enabled device to the second NFC enabled device, the public key for decrypting the encrypted electronic contract.

8. The system of claim 1, wherein the system is further operable to:

transmit, from the second NFC enabled mobile device to a third NFC enabled mobile device used by a third contracting party who is a party to the electronic contract, the electronically signed electronic contract that has been electronically signed by the first contracting party and the second contracting party; and in response to the third contracting party electronically signing the electronic contract, transmit, from the third NFC enabled mobile device to the first NFC enabled mobile device, the electronic contract that includes electronic signatures from the first contracting party, the second contracting party, and the third contracting party.

9. The system of claim 1, wherein the system is further operable to:

generate, by the second NFC enabled mobile device, a booking receipt for a product ordered from the first contracting party by the second contracting party, wherein the product is protected by a physical barrier, and wherein the physical barrier is equipped with an NFC reader;

detect, by the NFC reader, a presence of the second NFC enabled mobile device against the NFC reader;

in response to the second NFC enabled mobile device being placed against the NFC reader, transmit the booking receipt to the NFC reader; and in response to the NFC reader receiving the booking receipt, open the physical barrier and release the product to the second contracting party.

10. A Near Field Communication (NFC) enabled mobile device having at least one component operable to:

provide an electronic contract on the NFC enabled mobile device, wherein the NFC enabled mobile device is a first NFC enabled mobile device that is used by a first contracting party to an electronic contract;

determine whether the first NFC enabled mobile device is within NFC range of a second NFC enabled mobile device used by a second contracting party to the electronic contract;

in response to determining that the first NFC enabled mobile device is within NFC range of the second NFC enabled mobile device, apply an electronic signature of the first contracting party using the first NFC enabled mobile device through a secure element of the first NFC enabled mobile device, and transmit the electronically signed contract from the first NFC enabled mobile device to the second NFC enabled mobile device, wherein the electronically signed electronic contract is transmitted from the first NFC enabled mobile device to the second NFC enabled mobile device by tapping the first NFC enabled mobile device against the second NFC enabled mobile device; and in response to determining that the first NFC enabled mobile device is not within NFC range to the second NFC enabled mobile device, send, from the first NFC enabled mobile device to the second NFC enabled mobile device, a multimedia messaging service (MMS) message that includes the electronic contract.

11. The NFC enabled mobile device of claim 10, wherein the electronic signature includes a digital signature generated and applied on the electronic contract using public-key cryptography through one or more underlying mobile applications stored and executed on secure elements of the first NFC enabled mobile device and the second NFC enabled mobile device.

* * * * *